US006853997B2

(12) United States Patent
Wotring et al.

(10) Patent No.: US 6,853,997 B2
(45) Date of Patent: *Feb. 8, 2005

(54) SYSTEM AND METHOD FOR SHARING, MAPPING, TRANSFORMING DATA BETWEEN RELATIONAL AND HIERARCHICAL DATABASES

(75) Inventors: Steven C. Wotring, Austin, TX (US); John R. Ripley, Round Rock, TX (US)

(73) Assignee: Infoglide Corporation, Austin, TX (US)

( * ) Notice: Subject to any disclaimer, the term of this patent is extended or adjusted under 35 U.S.C. 154(b) by 411 days.

This patent is subject to a terminal disclaimer.

(21) Appl. No.: 09/681,936

(22) Filed: Jun. 28, 2001

(65) Prior Publication Data

US 2002/0010700 A1 Jan. 24, 2002

Related U.S. Application Data

(60) Provisional application No. 60/214,892, filed on Jun. 29, 2000.

(51) Int. Cl.[7] .............................................. G06F 17/30
(52) U.S. Cl. ........................ 707/100; 707/101; 707/103
(58) Field of Search ............................. 707/100–104.1, 707/1–10, 200–205; 709/203–216; 706/45–50; 715/501.1, 510–513

(56) References Cited

U.S. PATENT DOCUMENTS

| 5,717,924 | A | * | 2/1998 | Kawai | 707/102 |
|---|---|---|---|---|---|
| 5,724,577 | A | * | 3/1998 | Exley et al. | 707/100 |
| 5,764,978 | A | * | 6/1998 | Masumoto | 707/100 |
| 5,907,843 | A | | 5/1999 | Cleron et al. | |
| 5,974,407 | A | * | 10/1999 | Sacks | 707/2 |
| 6,061,697 | A | | 5/2000 | Nakao | |
| 6,076,090 | A | * | 6/2000 | Burroughs et al. | 707/102 |
| 6,101,502 | A | * | 8/2000 | Heubner et al. | 707/103 R |
| 6,199,059 | B1 | * | 3/2001 | Dahan et al. | 707/3 |
| 6,374,252 | B1 | * | 4/2002 | Althoff et al. | 707/102 |
| 6,377,934 | B1 | * | 4/2002 | Chen et al. | 705/10 |
| 6,427,123 | B1 | * | 7/2002 | Sedlar | 702/2 |
| 6,480,857 | B1 | * | 11/2002 | Chandler | 707/100 |
| 6,539,398 | B1 | * | 3/2003 | Hannan et al. | 707/103 R |
| 6,594,672 | B1 | * | 7/2003 | Lampson et al. | 707/103 R |
| 6,665,677 | B1 | * | 12/2003 | Wotring et al. | 707/100 |
| 6,684,222 | B1 | * | 1/2004 | Cornelius et al. | 707/104.1 |
| 6,708,164 | B1 | * | 3/2004 | Cseri et al. | 707/4 |
| 2001/0034733 | A1 | * | 10/2001 | Prompt et al. | 707/102 |
| 2003/0204511 | A1 | * | 10/2003 | Brundage et al. | 707/100 |
| 2004/0030716 | A1 | * | 2/2004 | Hoth et al. | 707/103 R |

FOREIGN PATENT DOCUMENTS

WO          WO 00/23917         *  4/2000    ................... 17/30

OTHER PUBLICATIONS

Meier A et al. Hierarchical to relational database migration, Software IEEE vol. 11, issue :3, May 1994, pp 21–27.*

* cited by examiner

*Primary Examiner*—Srirama Channavajjala
(74) *Attorney, Agent, or Firm*—Taylor Russell & Russell, P.C.

(57) ABSTRACT

The present invention provides a computer-implemented system and method for transforming relational database information into a hierarchical data representation. It provides for data sharing between a relational and hierarchical data structures without requiring the data to be remodeled to fit a common format or convention. While maintaining the relational data in its original format, user may transform and associate the data with a structure compatible with another format definition. The present invention may use XML, HTML and SGML to structure a hierarchical data representation. Object-oriented formats may also be used to structure the data in an intermediary format for transformation into a hierarchical data structure.

27 Claims, 12 Drawing Sheets

400 element = <elementname[(attribute)*]>expression[(element)*]</elementname>

401 attribute = type="elementtype";datasource="url";transform="transformobject"

402 elementtype = statement or field or static 403 url = datasource location identifier 404 expression = SQL statement or fieldname or static value 405 transformobject = classname of object responsible for transforming text of this node 406 fieldname = dataset fieldname [(|dataset fieldname)*]

FIGURE 4A

407 <Person datasource="jdbc:odbc:MyDatabase" type="statement">select * from person where ID=?

408 <Date of Birth type="field">DOB</Date of Birth>

<SSN type="field">Social Security Number</SSN>

409 <Name datasource="jdbc:odbc:MyDatabase" type="statement">select * from Name where Person_ID=:ID <First type="field">First</First>
    <Middle type="field">Middle</Middle>
    <Last type="field">Last</Last>

</Name>

<Physical Description datasource="jdbc:odbc:MyDatabase" type="statement"> select Hair Color,Eye Color,Height,Weight from Physical Description where Person_ID=:ID <Hair Color type="field">Hair Color<Hair Color>
    <Eye Color type="field">Eye Color<Eye Color>

410 <Height type="field" transform="com.infoglide.transform.ProperHeight"> Feet|Inches<Height>

<Weight type="field" transform="com.infoglide.transform.PoundstoKilos"> Weight<Weight>

</Physical Description>

</Person>

FIGURE 4B

SYSTEM AND METHOD FOR SHARING, MAPPING, TRANSFORMING DATA BETWEEN RELATIONAL AND HIERARCHICAL DATABASES

CROSS REFERENCE TO RELATED APPLICATIONS

Referenced-applications

This application claims the benefit of U.S. Provisional Application Ser. No. 60/214,892, filed Jun. 29, 2000.

BACKGROUND OF INVENTION

The present invention relates generally to database systems. More particularly, the invention is a computer-implemented method that allows data in different databases, which may have different formats and structures, to be shared without remodeling the data to fit an existing data convention. The system and method provide for transforming relational database information into a hierarchical data representation format.

Modern information resources often comprise huge databases that must be searched, in order to extract useful information. One example of this includes data found on global information networks. With the wealth of information available today, and its value to businesses, managing information effectively has become essential. However, existing database technologies, including recent advances in database integration, are often constrained when interacting with multiple, voluminous data sources.

As a growing number of companies establish Business-to-Business (B2B) and Business-to-Consumer (B2C) relationships using a global communications network, such as the Internet, traditional data sharing among multiple large data sources has become increasingly problematic. Data required by businesses is often stored in multiple databases, or supplied by third party companies. Additionally, data sharing difficulties are often magnified as companies attempt to integrate internal and external databases that are always increasing in number and kind. As a result, combining data from separate sources typically creates an expensive and time-consuming systems integration task.

In order to exchange data between entities, data standardization has been used in an attempt to achieve data integration and interoperability. Standards bodies like RosettaNet, BizTalk, OASIS, and ACORD, are available to standardize data so that it can be exchanged more easily. However, there are many problems presented by these solutions. In order to participate in a consortium, all participants' data has to be modeled in the same manner. Additionally, various consortia and standards bodies that have been established to handle similar types of data often have different standards that correspond to specific industries. Also, the adoption of standards is slow, because businesses within each industry still modify data to fit their own company requirements. Hence, given the number of different consortia, standards, and industries, there is still a need for a standard means to exchange data and data structure between different data structures and databases, among companies of the same and different industries, and even among departments of single companies.

One current approach to filling this need is to painstakingly map one field of data to another, in order to exchange the data with a "non-conformant" entity; that is, one that uses different data structure standards. This process must be repeated not only for every field but also for every different exchange. These solutions to the exchange problem are generally custom "hard-coded" solutions. An efficient, user-configurable method for sharing data between different data structures is still lacking.

Database technologies, such as Structured Query language (SQL), Open Database Connectivity (ODBC), Extensible Markup Language (XML), and other tools, have been developed to facilitate database integration. As beneficial as these technologies may be, however, they have failed to address inherent differences in the structure and organization of databases, in addition to the contents. These differences are important, because the richness of the original structure often contributes to the value of its underlying data.

For example, when attempting to store the same type of data or object, such as a customer description, database designers may use different field names, formats, and structures. Fields contained in one database may not be used in another. If understood and logically integrated, these disparities can provide valuable information, such as how a company gains competitive advantage based on its data structuring. Unfortunately, today's database technologies often cleanse the disparities out of data to make it conform to standards of form and structure. Examples include databases that are converted from one representation to another representation and expressed in XML, using its corresponding hierarchical structure.

Integrating data from multiple environments and formats into a single interoperable structure is particularly necessary to seamless B2B electronic commerce (e-Commerce), and XML enables data to look much more alike than any previous format. However, there are still problems with using XML to represent data. These problems fall into two major categories: 1.) dirty and naturally occurring data perplex XML searching and storage and 2.) data formats or data schemas in the original databases that offer competitive advantage or better reflect the true model of the business and its data, are sacrificed to standards consortia. This means that the database formats or schemas have to be fit into the consortia data standards, which requires a highly skilled technical staff to spend a large amount of time comparing one database schema to another. Moreover, the standards being used and developed to overcome these data exchange barriers sacrifice competitive advantage for interoperability. Today, businesses require both.

Conforming to industry standards may also raise other issues, such as intellectual property issues; the ability for data modeled to a specific consortium standard to communicate with other consortia that use a different model or standard; and the handling of legacy data in multiple formats.

SUMMARY OF INVENTION

The present invention, which is a system and method for allowing data to be shared without requiring that the data be remodeled to fit a common format or convention, solves the aforementioned needs. The users of the data, which may be within a company or different entities that need to share data, may keep the their own data formats and may dynamically transform the data contained in their structure into a structure compatible with another definition without having to physically change their data or its structure.

Transforming data from a Relational Database Management System (RDBMS) to a hierarchical format relates to numerous information processing and computer programming disciplines. First, the method relates to the field of data management, including database command expressions, dataset storage and retrieval techniques, database connection methods, and keyed-index traversal between datasets. Second, the structural transformation elements incorporate the use of object-oriented programming techniques where trees are used for the hierarchical representation of de-normalized relational database information, henceforth known as logical records. Third, the invention incorporates the discipline of using markup languages for the representation and presentation of information to a user through a graphical user interface. Fourth, the invention uses Relational Database Management Systems (RDBMS) and the grouping of concepts that belong to the subject, such as Structured Query Language (SQL), tables, datasets, rows, columns, indices, primary keys, and foreign keys. Finally, the invention relates to the discipline of hierarchical data management, including temporary and permanent storage, and retrieval techniques including, but not limited to markup language format.

When sharing data between a Relational Database Management System (RDBMS) and a hierarchical information presentation format, there is an inherent need to transform the original tabular structure of the information into a tree-like, hierarchical representation. Since RDBMS information is stored in separate tables joined through a specified key structure, information needs to be repackaged as a whole for use in data communication across a local area network (LAN), or a wide area network (WAN). Information in a RDBMS is often stored in a normal form, where information is broken down into the smallest logical units. When extracting information from a database where information is stored in normal form, it is necessary to develop a transformation method to rebuild a logical grouping of information from the normalized information format that is stored in the RDBMS.

The current invention discloses a system and method for transforming data stored in relational format into a hierarchical format such as a markup language, not limited to Extensible Markup Language (XML), Hyper Text Markup Language (HTML), and Standard Generalized Markup Language (SGML). In addition, a method where a hierarchical format can be represented in tree structures using, but not limited to, an object-oriented programming format. These object-oriented formats can be used as an intermediary format for which to temporarily store information in a computational processing device in the systems random access memory or any permutation of hard disk drives, or media storage devices. As information is transformed into the hierarchical structure from a RDBMS, the information then assumes the hierarchical representation of the logical records contained in the database. The present invention solves the aforementioned needs, by providing a system and method for data sharing, without requiring that the data be remodeled to fit a common format or convention.

An embodiment of the present invention is directed to a method for sharing data between a relational database and a hierarchical database that comprises defining a hierarchical data entity including a plurality of elements, mapping each of the plurality of elements in the hierarchical data entity to information in a relational dataset contained in a relational database, transforming the relational dataset information into corresponding mapped elements in the hierarchical data entity to form a hierarchical data structure, and accessing data from the hierarchical data structure corresponding to the relational dataset information in the relational database. The step of defining a hierarchical data entity may comprise defining a hierarchical data entity including a plurality of elements containing a data entity structure and mapping information. The method may further comprise identifying each of the plurality of elements by an element name without reference to an entity path. The step of defining a hierarchical data entity may comprise defining a hierarchical data entity including a plurality of elements containing a data entity structure and defining a hierarchical map structure corresponding to the hierarchical data entity containing mapping information. The method may further comprise identifying each of the plurality of elements by an entity path referencing all parent elements in the entity path. The step of defining a hierarchical data entity may comprise defining simple elements and compound elements. The step of defining a simple element may comprise defining an element name and mapped fields. The step of defining a simple element may comprise defining an entity path and mapped fields. The step of defining a compound element may comprise defining an element name, a database name, a database command, and database fields. The step of defining a compound element may comprise defining an entity path, a database name, a database command, and database fields. The step of mapping each of the plurality of elements may comprise reading the hierarchical data entity, determining if a root element is present, ending the mapping process if no root element is present, mapping each compound element of the plurality of elements if a root element is present, and mapping each simple element of the plurality of elements if a root element is present. The step of mapping each compound element may comprise selecting a compound element, specifying a data source for the compound element, specifying a database command expression for the compound element, executing the database command expression, receiving a dataset containing fieldnames from the data source, adding the dataset fieldnames to a dataset field list in the compound element for enabling simple elements to map to the information in the dataset, and repeating the above steps for each compound element. The step of mapping each simple element may comprise selecting a simple element, selecting a source dataset fieldname corresponding to the simple element in a dataset field list of a parent element, specifying data transformation algorithms associated with the simple element, and repeating the above steps for each simple element. The step of transforming the relational dataset information may comprise receiving the mapped plurality of elements, creating a dataset for each compound element of the plurality of elements that contains a database command expression, opening the dataset for each compound element, transforming each compound element in the mapped elements starting with the root element of the mapped elements, and transforming each simple element of the plurality of elements in the mapped elements. The step of transforming each compound element may comprise selecting a compound element, locating a dataset that is nearest to a compound element, creating an instance of the compound element for every record in the dataset, and repeating the above steps for each compound element. The step of transforming each simple element may comprise selecting a simple element, extracting values from each dataset field that map to the simple element, creating a simple element in the hierarchical data structure that corresponds to the simple map element, transforming data values contained in the dataset fields by transformation algorithms, adding the transformed values to other values corresponding to the simple map element, and repeating the above steps for all simple elements. A computer program embodied on a computer-readable medium may incorporate the method described above.

Another embodiment of the present invention may be a system for sharing data between a relational and a hierarchical database, comprising means for defining a hierarchical data entity including a plurality of elements, means for mapping each of the plurality of elements in the hierarchical data entity to information in a relational dataset contained in a relational database, means for transforming the relational dataset information into corresponding mapped elements in the hierarchical data entity to form a hierarchical data structure, and means for accessing data from the hierarchical data structure corresponding to the relational dataset information in the relational database. The means for defining a hierarchical data entity may comprise means for defining a hierarchical data entity including a plurality of elements containing a data entity structure and mapping information. The system may further comprise means for identifying each of the plurality of elements by an element name without reference to an entity path. The means for defining a hierarchical data entity may comprise means for defining a hierarchical data entity including a plurality of elements containing a data entity structure and means for defining a hierarchical map structure corresponding to the hierarchical data entity containing mapping information. The system may further comprise means for identifying each of the plurality of elements by an entity path referencing all parent elements in the entity path. The means for defining a hierarchical data entity may comprise means for defining simple elements and compound elements.

A further embodiment of the present invention may be a system for sharing data between a relational and a hierarchical database, comprising a hierarchical data entity having a plurality of elements, a mapping of each of the plurality of elements in the hierarchical data entity to information in a relational dataset contained in a relational database, a transformation of the relational dataset information into corresponding mapped elements in the hierarchical data entity for forming a hierarchical data structure, and a memory containing data from the hierarchical data structure corresponding to the relational dataset information in the relational database. The hierarchical data entity may comprise a plurality of elements containing a data entity structure and mapping information. The hierarchical data entity may comprise a plurality of elements containing a data entity structure and a hierarchical map structure. The hierarchical data entity may comprise simple elements and compound elements. Each simple element may comprise an element name and mapped fields. Each simple element may comprise an entity path and mapped fields. Each compound element may comprise an element name, a database name, a database command, and database fields. Each compound element may comprise an entity path, a database name, a database command, and database fields.

Another embodiment of the present invention includes a memory for storing data for access by an application program being executed on a computer system, comprising a hierarchical data structure having a plurality of simple and compound elements stored in the memory, database commands embedded in the compound elements for accessing information in a relational database, tabular datasets created in the memory for storing the accessed information from the relational database, and a relationship between the elements of the hierarchical data structure and the tabular datasets. The compound elements may comprise an element name property, a database name property, a database command expression, and a database fields property. The simple elements may comprise an element name property and a mapped fields property.

BRIEF DESCRIPTION OF DRAWINGS

These and other features, aspects and advantages of the present invention will become better understood with regard to the following description, appended claims and accompanying drawings where:

FIG. 4A shows a formal specification of a hierarchical data entity containing mapping information;

FIG. 4B shows an example of a hierarchical data entity containing mapping Information;

DETAILED DESCRIPTION

Figure 1:
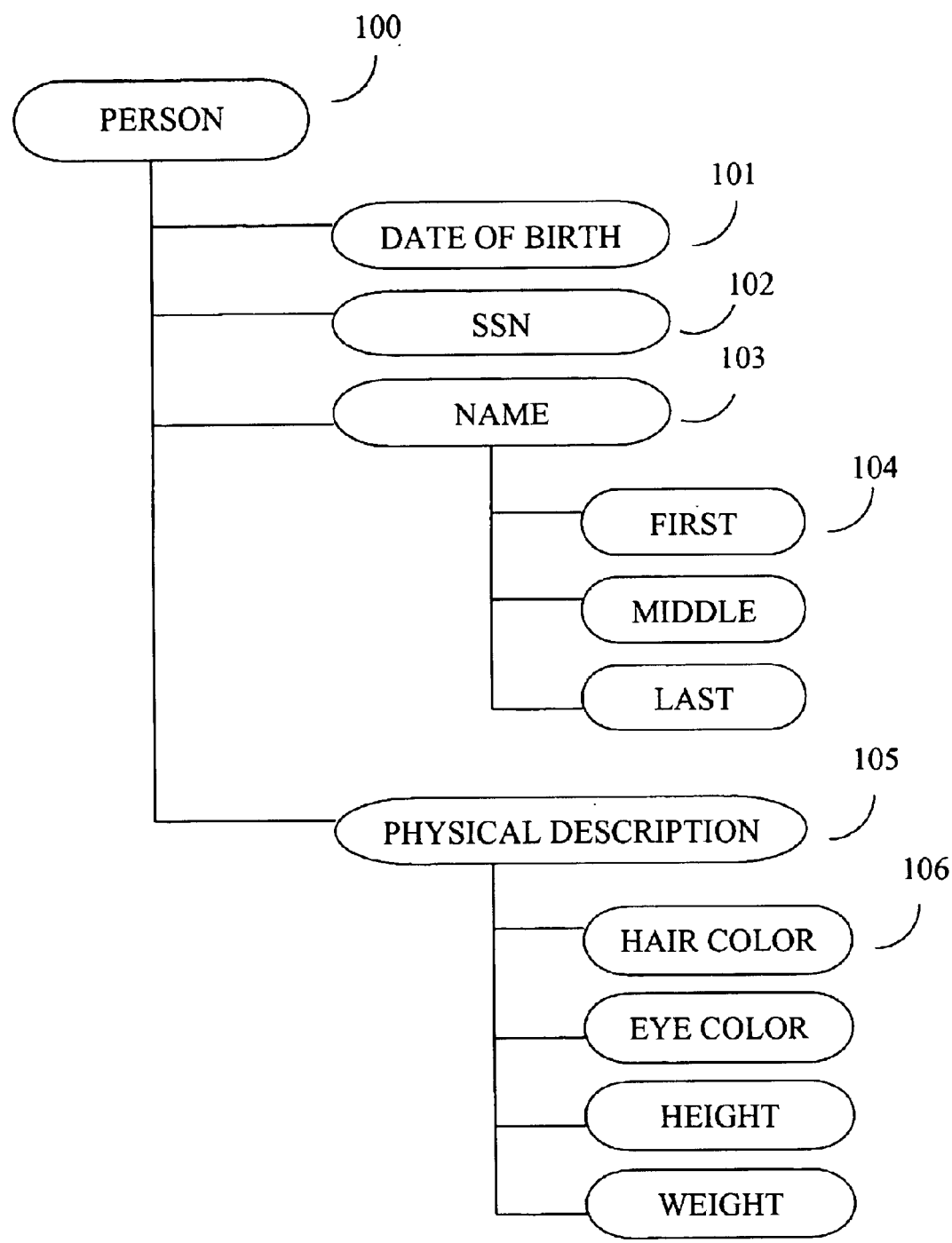
FIG. 1 shows an example of a hierarchical data entity.

FIG. 1 shows an example of a hierarchical data entity. A hierarchical data entity presents related information in categorized groupings, and it can be used to store, render, and map information from one data source to another. The hierarchical data entity 700 shown in FIG. 1 represents a person. The hierarchical data entity contains attributes that correspond to the person represented. These attributes might be simple in nature where they contain only one value to answer a specific attribute. The attributes Date of Birth 707 and Social Security Number (SSN) 702 are simple attribute because there is only one value to describe each of them. Other attributes can be complex in nature where they contain child attributes that together describe the parent attribute. Name 703 is a compound attribute, which contains child attributes, such as First 704. Likewise, Physical Description 705 is a compound attribute, which contains child attributes, such as Hair Color 706. The children of compound attributes may comprise simple attributes, other compound attributes, or a combination of both simple and compound attributes.

Figure 2:
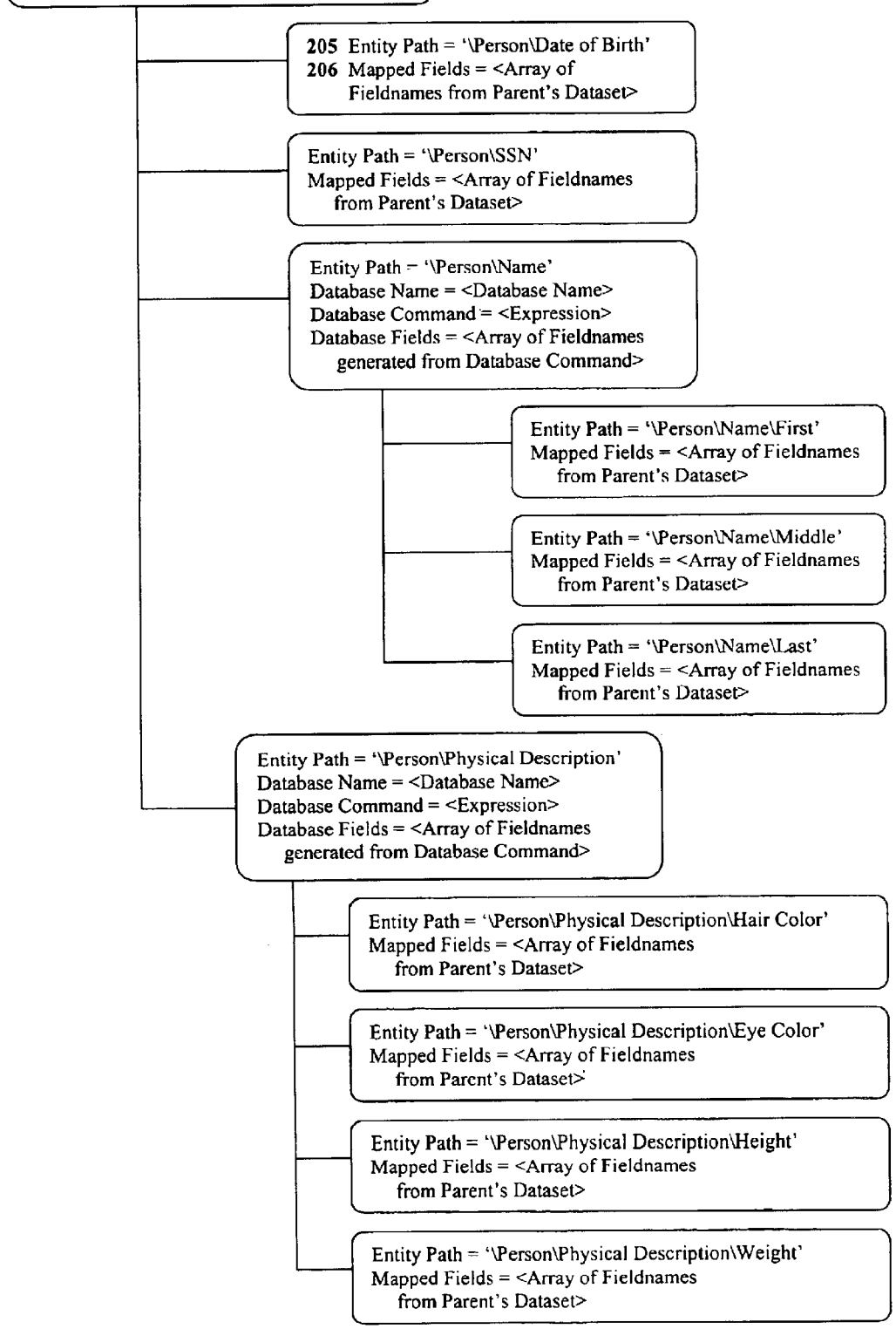
FIG. 2 shows an example of a hierarchical map structure, which corresponds to the example hierarchical data entity shown in FIG. 1.

FIG. 2 shows an example of a hierarchical map structure 200, which corresponds to the example hierarchical data structure shown in FIG. 1. The hierarchical data entity acts as a template, according to which data is to be transformed into a hierarchical structure. The hierarchical map structure uses the same hierarchical structure as the hierarchical data entity, but it provides properties that facilitate the mapping of a non-hierarchical data entity to a hierarchical data entity. The hierarchical map structure stores information from the relational structure at logically appropriate positions in the hierarchical data entity.

In the hierarchical map structure, elements are structural features that are analogous to the attributes in the hierarchical data entity. The hierarchical map structure contains a core property that allows an individual element to identify the attribute in the hierarchical data entity, to which the element relates. This property may be called, for example, an "Entity Path" or "Entity Context Path" 201. Both simple and compound data elements contain the Entity Path property 201, 205. The Entity Path 207 can display either the element name, or the full path of the hierarchical data entity attribute to which the hierarchical map element directly relates. For example, an Entity Path 205 corresponding to Date of Birth may display only the element name, such as Entity Path='Date of Birth'.

Or, the Entity Path 205 may display the full path of the hierarchical data entity attribute to which it relates, including reference to all parent elements in the path, such as Entity Path='Person\Date of Birth'.

In addition to the Entity Path 205, compound data elements contain other properties that allow for a relation of a compound element to a dataset in a database from which information is being converted to the hierarchical data structure. The Database Name property 202 allows the hierarchical map structure 200 to identify the name, or file system path, with which the database can be located. The Database Command 203 is an expression that can be interpreted by the individual database, to which the Database Name property 202 refers. The Database Command 203 can be any expression suitable for calling a database and extracting information. In one embodiment, the Database Command 203 is a low-level database application programmer interface (API) call. In another embodiment, the Database Command 203 is a Structured Query Language (SQL) command. Once a Database Command expression 203 is identified by the database that is referred to in the Database Name property 202, the Dataset Fields property 204 stores all of the fieldnames in the resulting dataset that is returned by the Database Command expression 203. The Dataset Field property 204 is subsequently used to map child elements of the current compound element to the fields that are returned by the Database Command expression 203.

Simple data elements contain a property in addition to an Entity Path 205, which facilitates the direct mapping between a hierarchical database field and a relational database field. The Mapped Fields property 206 allows a simple element to access its parent's Dataset Fields property 204. In this way, a valid dataset fieldname can be used to transfer data from the relational database to appropriate child locations in the hierarchical data entity. The Mapped Fields are described as arrays, but may be a single field that corresponds to one of the Database Fields in the parent.

The Hierarchical Map Structure of the current invention may be used in two ways. In one embodiment of the current invention, the Hierarchical Map Structure extracts data from a RDBMS, using the properties of the various elements. The hierarchical data entity, as described with reference to FIG. 1, is then traversed, and the Hierarchical Map Structure inserts the data into a hierarchical data entity at logically appropriate locations. Because both a hierarchical data entity and a Hierarchical Map Structure are used, this embodiment may be referred to as a dual-tree traversal method.

Figure 3:
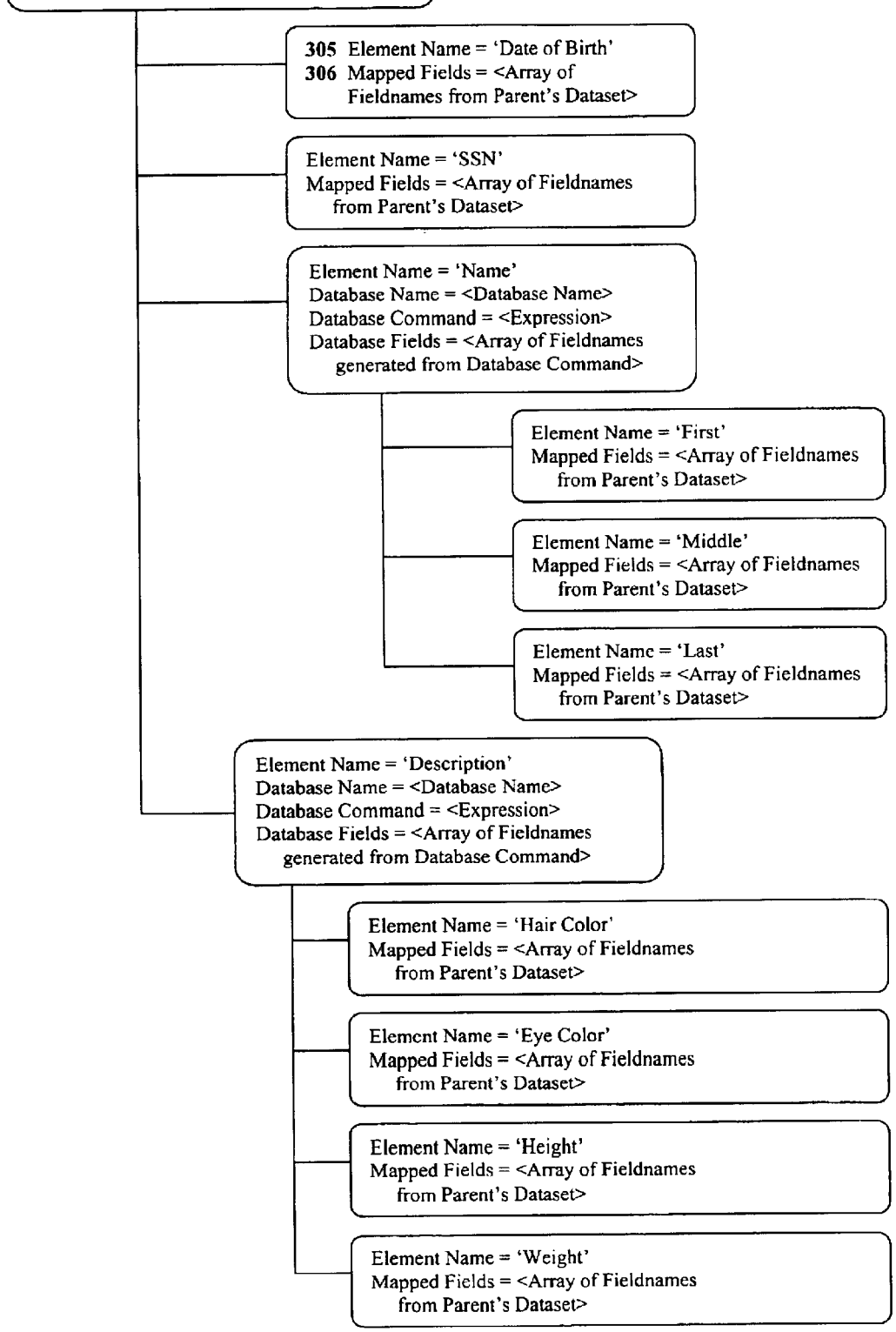
FIG. 3 shows an example of a hierarchical data entity containing mapping information.

In a second embodiment of the current invention, the hierarchical data entity may itself contain mapping information. In this embodiment, only one hierarchical data representation is used to store both the data entity structure and the mapping information. Hence, this embodiment may be referred to as a single-tree traversal method. FIG. 3 illustrates a hierarchical data entity containing mapping information 300. The single-tree mapping properties are similar to those of the dual-tree Hierarchical Map Structure described with reference to FIG. 2. However, rather than using an Entity Path, the single-tree embodiment uses an Element Name property 307. When creating a new element in a hierarchical data entity, the Element Name property 301 allows the element to be filled with a direct copy of data from the RDBMS, rather than receiving an indirect copy via an intermediate map structure. Both simple and compound elements contain the Element Name property 301, 305.

Unlike the Entity Path described with reference to FIG. 2, the Element Name 301 does not contain the entire path of an element. Rather, it only contains the element name. For example, an Element Name property 305 corresponding to Date of Birth displays only the element name, such as Element Name='Date of Birth', but not referencing all parent elements in the path, such as Entity Path='Person\Date of Birth'.

In addition to the Element Name property 305, compound data elements contain other properties that allow for the relation of a compound element to a dataset in the database, from which information is being converted to the hierarchical data structure. The Database Name property 302 allows the hierarchical data entity 300 to identify the name, or file system path, with which the database can be located. The Database Command 303 is an expression that can be interpreted by the individual database, to which the Database Name property 302 refers. The Database Command 303 can be any expression suitable for calling a database and extracting information. In one embodiment, the Database Command 303 is a low-level database application programmer interface (API) call. In another embodiment, the Database Command 303 is a Structured Query Language (SQL) command. Once a Database Command expression 303 is identified by the database that is referred to in the Database Name property 302, the Dataset Fields property 304 stores all of the fieldnames in the resulting dataset that is returned by the Database Command expression 303. The Dataset Field property 304 is subsequently used to map child elements of the current compound element to the fields that are returned by the Database Command expression 303.

Simple data elements contain a property in addition to an Element Name property 305, which facilitates the direct mapping between a hierarchical database field and a relational database field. The Mapped Fields property 306 allows a simple element to access its parent's Dataset Fields property 304. In this way, a valid dataset fieldname can be used to transfer data from the relational database to appropriate child locations in the hierarchical data entity.

For the current method, a hierarchical single-tree traversal method is used to create the transformed data entity. Using the map information provided, datasets are created from the compound elements so that simple elements can then receive the data that pertains to the mapped fields property. Using the hierarchical single-tree traversal method, data is then transformed from the relational database for to the hierarchical database form.

FIG. 4A shows a formal specification of a hierarchical data entity containing map information, in accordance with the single-tree transformation method described with reference to FIG. 3. Element names are embedded into the hierarchical structure using a markup language, where user-defined elements are allowed. The named map hierarchical data entity results in a single data entity that can transform external data into the format specified by the named map structure.

A named map is comprised of both simple and compound elements. Each element type has specific properties that relate to their function in the transformation process. Since the named map methodology uses built in context identification of elements, there is no need to specify a separate entity path. Instead, both simple and compound elements use an element tag 400. The element tag 400 allows for compound or simple elements to be created, using the contextual name of the information that will be stored in each location of the entity.

Attributes can be inserted into an element tag 400 to specify meta-data pertaining to the element. For a compound element, a number of different element attributes are used to relate the compound element to a dataset. Depending on the selection of individual element attribute types, the compound element is interpreted differently during the transformation process. For example, the attributes 407 of an element can contain information such as a data source, a type tag, and a transform tag.

The Elementtype attribute 402 describes the type of information that is to be extracted and inserted at that location in the hierarchy. This type of information may include a statement, a dataset field, or a static value as the source information to be transformed into the hierarchical entity. A URL attribute 403 is used to specify a name, path, or external network location of the database from which a dataset is to be created. An Expression attribute 404 is used to specify a database command expression that is used to extract data from the specified database. The Expression attribute 404 may comprise any suitable command for extracting information from a data source. The type of Expression attribute 404 that is used depends on the Elementtype 402. For example, if the Elementtype 402 is a statement, then the element can contain a Structured Query Language (SQL) statement as its Expression attribute 404. If the Elementtype 402 is a dataset field, then the element can contain, for example, a fieldname as its Expression attribute 404. If the Elementtype 402 is a static value, then the element can contain a static value as its Expression attribute 404.

For a simple element, other attributes are used, which allow a specific data value to be altered from its original state, and so that many fields can be mapped to an individual simple element, where necessary. The TransformObject attribute 405 specifies a program or program class that is used to alter or convert data that is to be inserted into the element tag during the transformation process. The fieldname attribute 406 allows multiple dataset fields to be mapped to a single simple element, using the pipe symbol '|' as a delimiter between fieldnames.

FIG. 4B shows an example of map element attributes and value specifications. A 'Person' compound element 407 has a data source attribute that specifies that the data source is located in jdbc:odbc:MyDatabase. A type attribute is also specified, which allows a map interpreter to understand that information contained within the 'Person' element tags will be of a statement type, or a database command expression. The 'Date of Birth' and 'SSN' simple elements 408 contain type attributes that inform the map interpreter that the information contained within the element tags will be a fieldname from a dataset. In the example, these are 'DOB' and 'Social Security Number'. The 'Name' compound element 409 is nearly identical to the 'Person' element, but it contains a Structured Query Language (SQL) expression that facilitates a hierarchical retrieval of information within a dataset, such that a first, middle, and last name can be properly retrieved to fill the simple attributes of the 'Name' element.

The 'Height' simple element 410 contains a type attribute to describe that the element contains dataset fields. In addition, the transform attribute specifies a specific computer program to call after extracting the data from the dataset, in order to insert a transformed value between the 'Height' tags. The fieldname specification is identified by the pipe symbol '|' placed between the names of the two fields that are mapped to the element. For this example, the computer program will take two separate values that represent a height, and display them as one value with the proper unit values of feet and inches. In the 'Weight' simple element, the computer program called converts a weight value in pounds to an equal weight value in kilograms.

Figure 5:
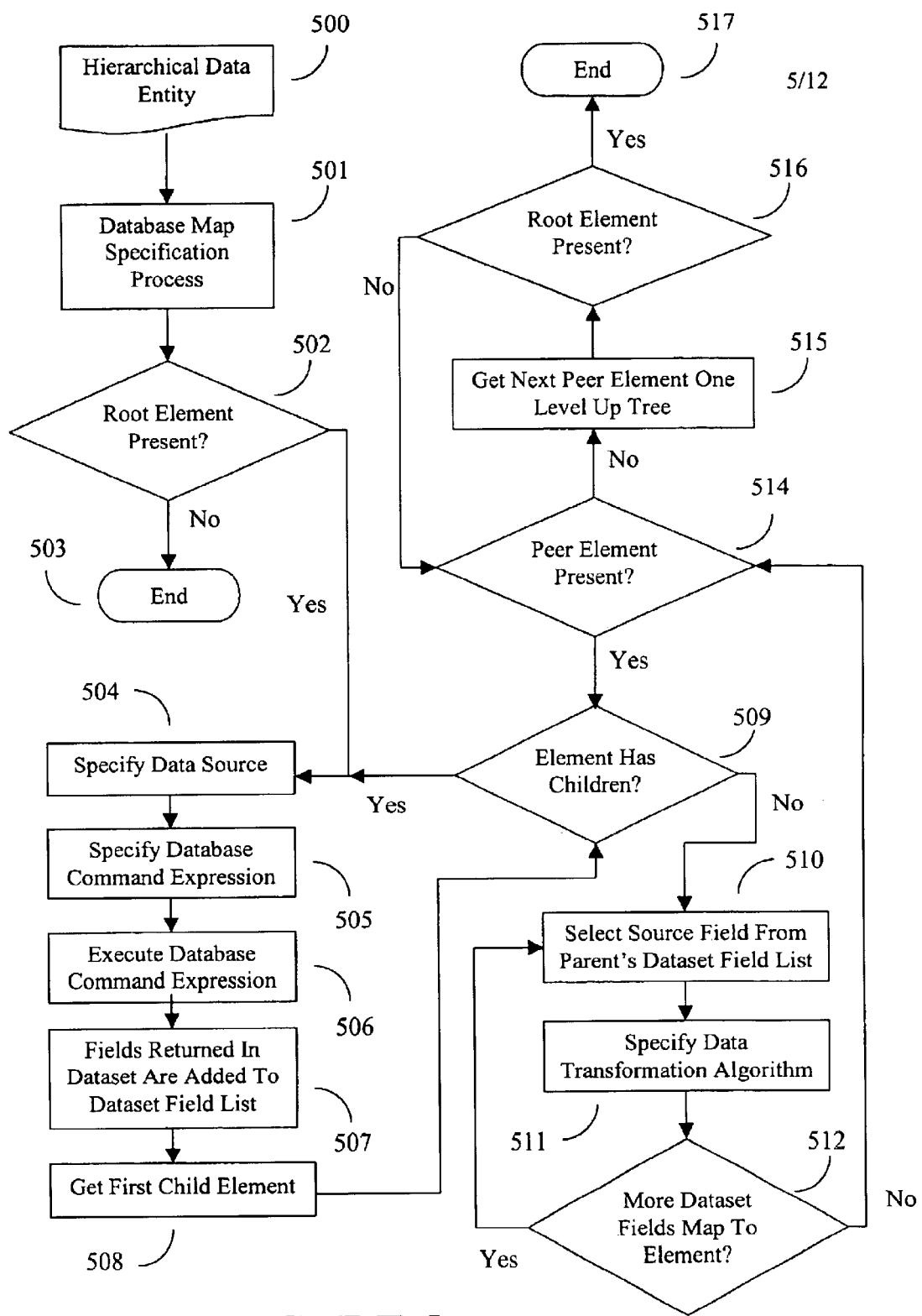
FIG. 5 shows a flow diagram of a relational to hierarchical mapping process.

FIG. 5 illustrates the flow of a relational to hierarchical mapping process, in accordance with the present invention. The Relational to Hierarchical Mapping process entails traversing a map structure to specify the mapping information for each element in a hierarchy. The mapping process is performed in order to create a map from a hierarchical data entity to a series of datasets that represent a hierarchical grouping of information. During the mapping process, all of the information pertaining to datasets, database command expressions, dataset fields, mapped fields, and data transformation algorithm are specified.

The process begins by passing a hierarchical data entity 500 into a database map specification process 501. The structure of the hierarchical data entity is traversed until all of its elements are mapped. The hierarchical data entity can come in a number of different formats, not limited to the previously described examples, 'Separate Hierarchical Data Entity and Map Structure', 'Hierarchical Data Entity Containing Map Information', and 'Named Map Hierarchical Data Entity'. When the hierarchical data entity has been established, the map specification process 501 is begun.

In accordance with step 502 in the map specification process, it is determined whether there is a root element present in the hierarchy. If there is no root element present, the mapping process terminates, in accordance with step 503, due to non-existence of a map hierarchy. If a root element is present, then compound element data attributes can be specified, as described with reference to FIG. 4A. First, a data source is specified for the compound element, in accordance with step 504. In accordance with step 505, a database command expression is specified that can be interpreted by the data source specified in step 504. The database command expression is then executed, in accordance with step 506. This execution first involves submitting the database command expression to the data source. The database command is then interpreted by the data source, and a dataset is returned. The fieldnames that are contained in the dataset are then added to a dataset field list, in accordance with step 507, so that simple elements can map to the information provided in the dataset.

After a compound element has been mapped, its first child element is located, in accordance with step 508. It is then determined whether the element has children, in accordance with step 509. If the element has children, the compound element mapping properties are specified, resulting in another iteration of steps 504–509. If the element does not have children, the mapping process follows a series of steps for mapping a simple element.

In accordance with step 570, mapping a simple element first involves selecting a suitable dataset field located in the dataset field list of the parent element. If applicable, data transformation algorithms can then be specified for the simple map element, in accordance with step 517. These transformation algorithms can be, but are not limited to, references to computer program function libraries, scripting language functions, dynamic link libraries, and precompiled computer functions. Once a field has been mapped and the data transformation algorithms are specified, one or more additional fields may be specified that may be mapped to the simple element, in accordance with step 512. If additional fields need to be mapped, the simple element mapping process is repeated, resulting in at least one additional iteration of steps 510–512.

If there are no more fields to be mapped to the simple element, it is first determined whether such a peer element exists, in accordance with step 574. If a peer element is located, it is determined whether the peer element has children, in accordance with step 509. If the peer element has children, then at least one additional iteration of steps 504–509 is performed, to reach the next simple element to be mapped. If the peer element has no children, then the peer element is mapped, in accordance with steps 570–512.

If a peer element could not be located in step 574, an attempt is made to go up one level in the hierarchical entity and locate the next suitable element to be processed, in accordance with step 515. At the level above the element for which the last mapping was completed, an attempt is made to locate an acceptable peer element. For each traversal up the hierarchical entity, a check is made for each new element encountered to see if it is a root element, in accordance with step 516. If a peer element is located at a higher level in the hierarchical entity, and it is not a root element, then the mapping process falls back to determining whether the current element has children, in accordance with step 509. If the root node of the hierarchical entity is located, the mapping process is then considered complete, and the process ends, in accordance with step 517.

Figure 6:
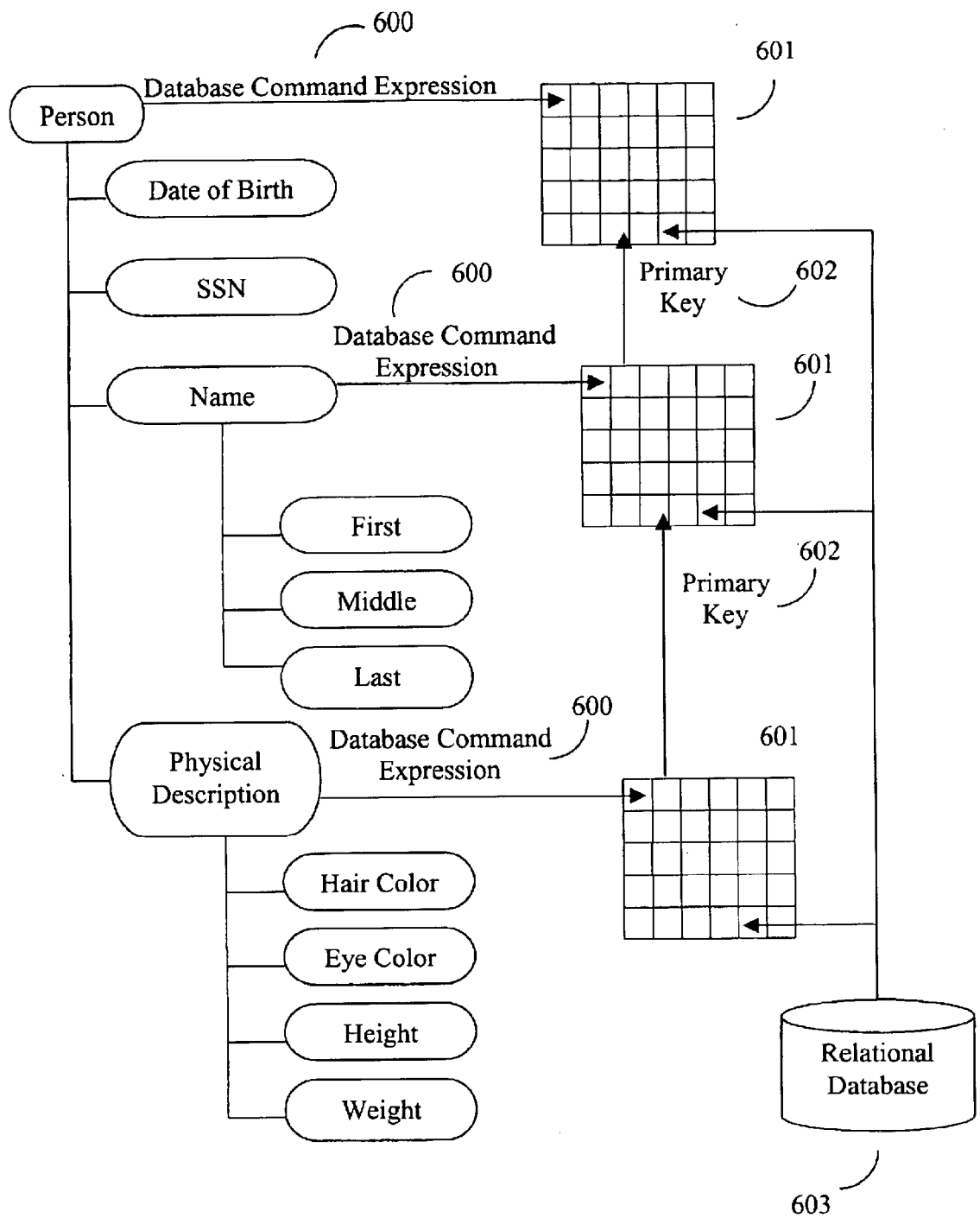
FIG. 6 shows a diagram of the relational to hierarchical mapping process.

FIG. 6 is a diagram of the relational to hierarchical mapping process. It represents how database command expressions interact between a hierarchical data entity and a dataset. Database Command Expressions 600 are used to create tabular datasets 601 containing rows and columns of information provided by a RDBMS 603. A Database Command Expression is a method for communicating with a database management system in order to read, write, and update information in the RDBMS 603. Database Command Expressions may be expressed, for example, in Structured Query Language (SQL) for interaction with a relational database management system.

The datasets created from information in the RDBMS are joined by primary keys 602. By using specific database command expressions 600 in conjunction with a hierarchical data entity, data that is stored in non-hierarchical format can be transformed into the hierarchical data entity structure. Through submitting a series of database command expressions where the datasets returned have applicable key structures, data can then be extracted from a RDBMS 603 into a temporary dataset hierarchy, which can then be traversed and transformed into a hierarchical data entity. Using this methodology, user addressable fields in each dataset 601, such as column field names or numeric column identifiers, are joined to individual hierarchical data entity elements.

Figure 7:
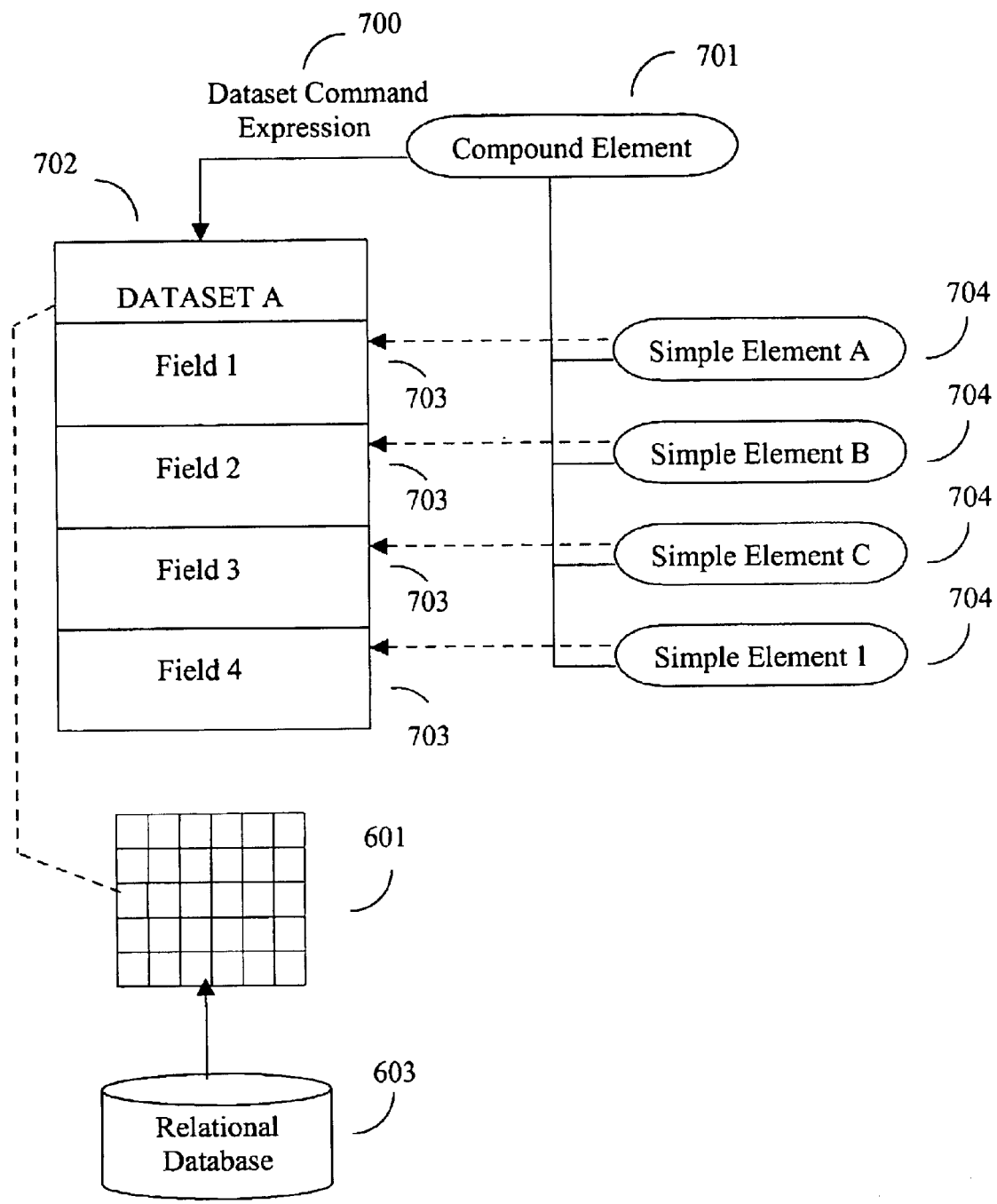
FIG. 7 shows a diagram of the relationship between a hierarchical data entity segment and a database dataset.

FIG. 7 depicts the relationship between a database dataset and a level, or segment, in a hierarchical entity. A hierarchical data entity segment is a portion of hierarchical data entity comprising a compound element 700 that contains a plurality of either simple or compound child elements 704. A database dataset 702, as described with reference to FIG. 6, is an entity that contains a plurality of fields 703 used to store data. The compound element 700 stores a database command expression 701 that is used to extract information from a relational database 603. Once the database command expression 707 returns a dataset 607 from the database 603, individual elements 704 that belong to the compound element 700 are associated with the fields 703 returned in the dataset 702. The information in each field 703 is then applied to the associated element 704 in the hierarchical data entity segment.

Figure 8A:
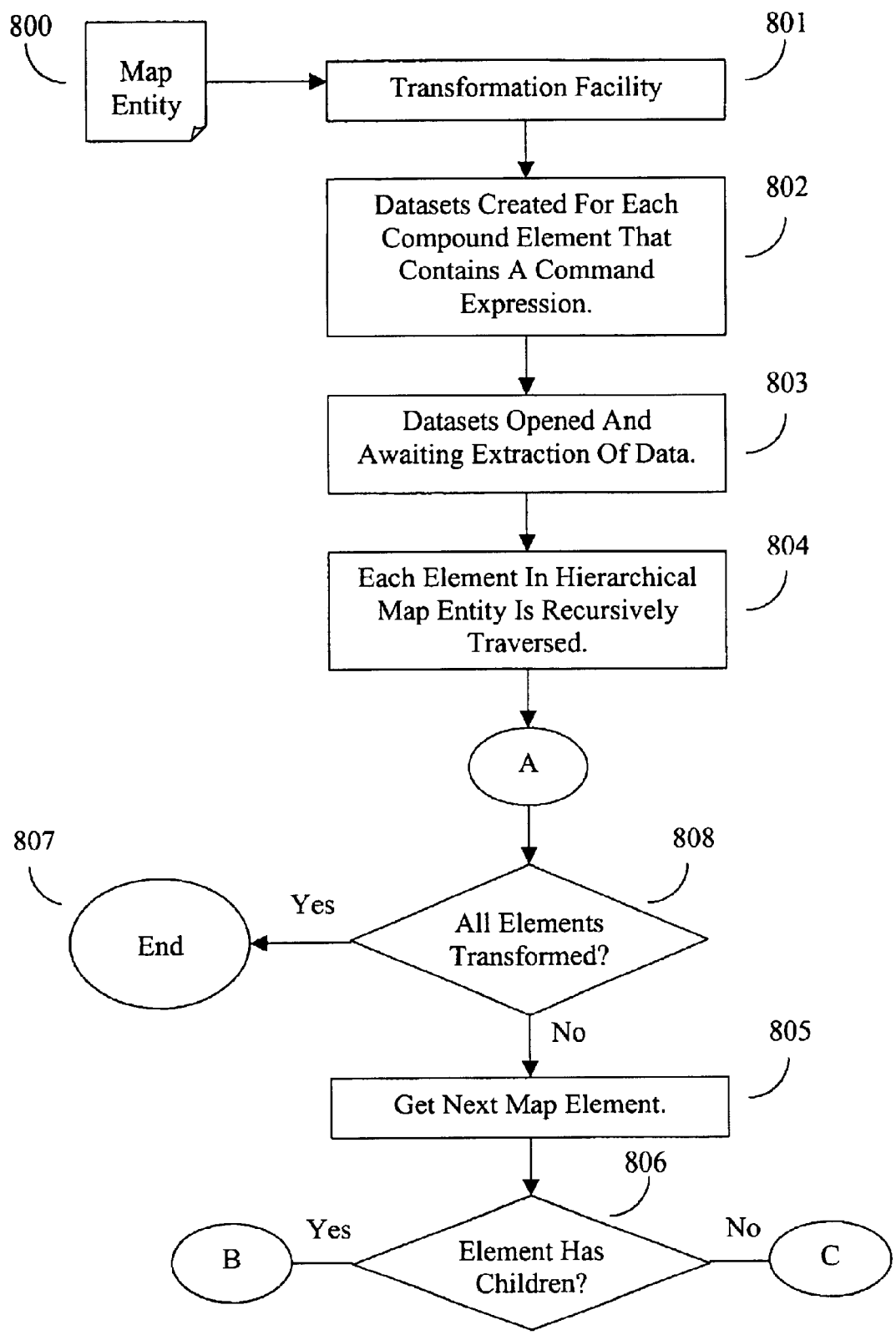
FIG. 8A shows a first portion of a flow diagram of a relational to hierarchical transformation process.
Figure 8B:
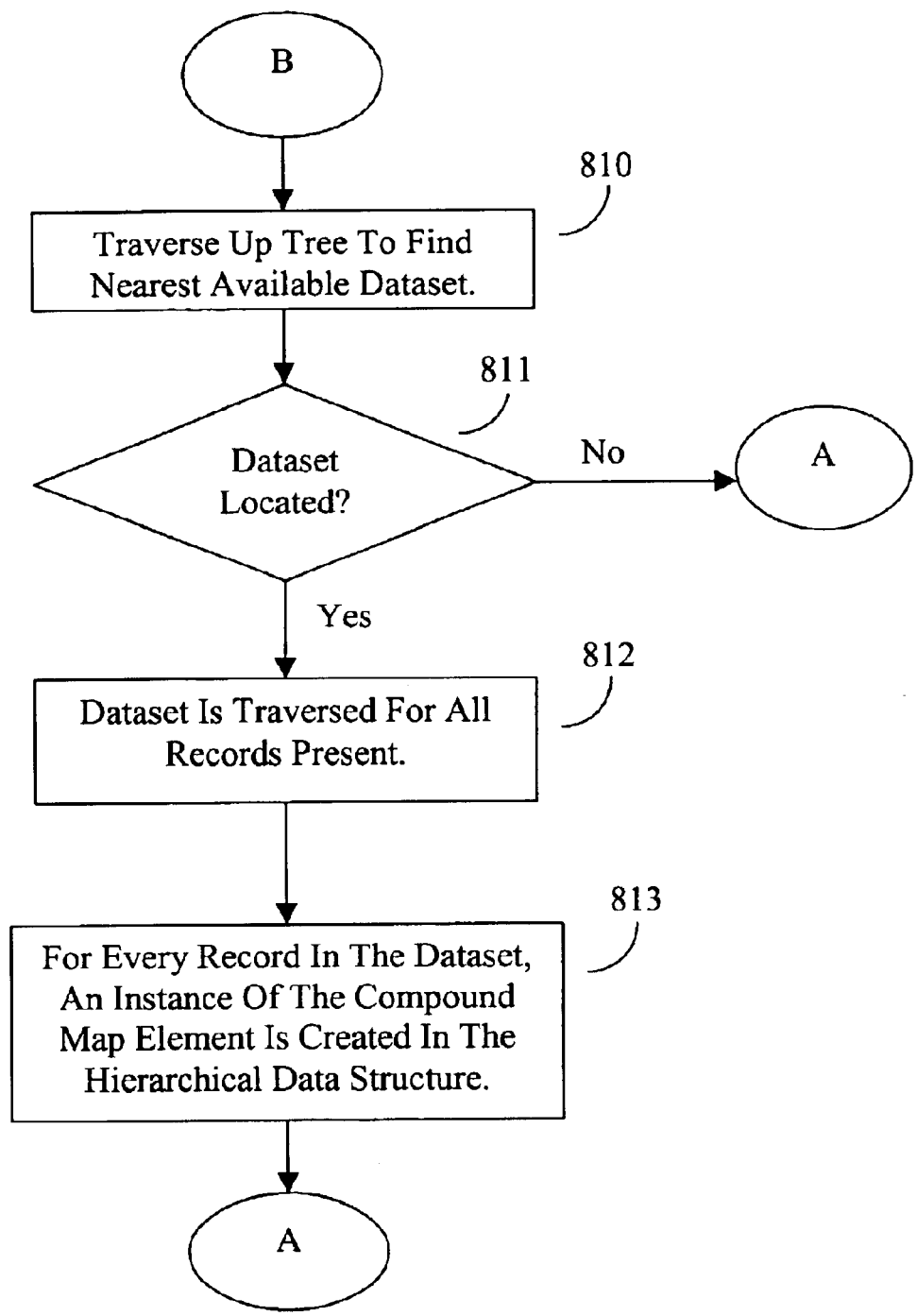
FIG. 8B shows a second portion of a flow diagram of a relational to hierarchical transformation process, wherein a current element has children.
Figure 8C:
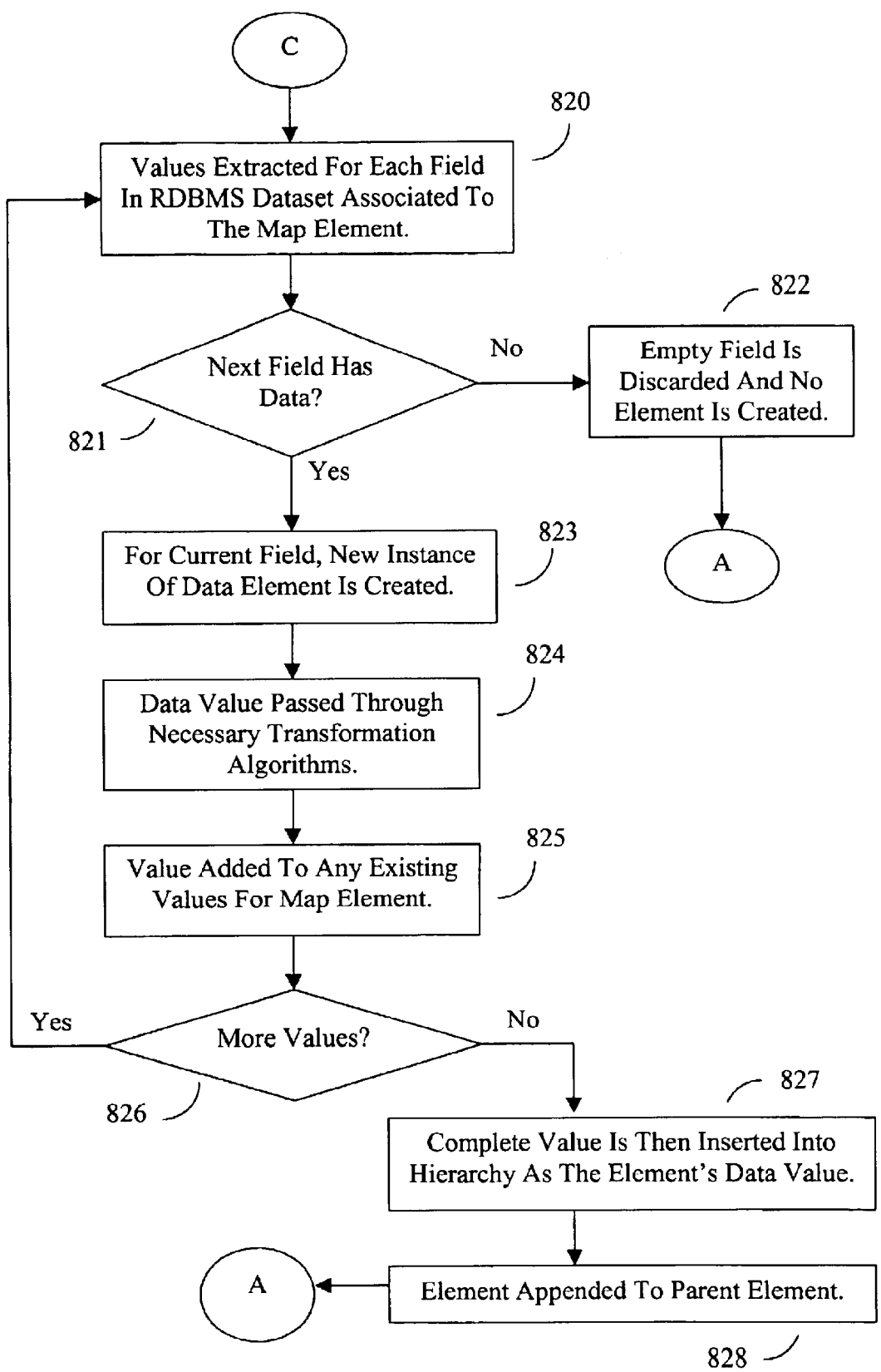
FIG. 8C shows a third portion of a flow diagram of a relational to hierarchical transformation process, wherein a current element does not have children.

FIGS. 8A–8C illustrate portions of a flow diagram for a process of transforming a relational database to a hierarchical structure, in accordance with the present invention. These figures represent the workflow that is used to render dataset information into a hierarchical data entity. The transformation process interprets a hierarchical mapping structure and facilitates the interchange of information from relational database format to a hierarchical entity representation. The transformation process recursively traverses through each element in the map entity finds associated datasets and dataset fields for each map element, and creates corresponding elements in a hierarchical data structure. After building the structure, the process fills the elements in the structure with corresponding data values. Hence, the transformation process bridges the gap between a hierarchical data map and the proper hierarchical representation of the source data. The transformation process is designed to facilitate creating hierarchical entities one at a time, in a batch mode, or on demand.

To begin the process, a hierarchical database map entity 800 is passed into a transformation facility 807. Upon receiving the map, the transformation facility 801 prepares the map for the transformation process. In accordance with step 802, datasets are created for each map element that contains a database command expression. Once the datasets are created, they are opened to await data extraction, in accordance with step 803. In one embodiment, data caching and database command expression optimizations may be performed at this point to minimize the number of commands submitted to update datasets from a database.

Starting at the root element of the map, in accordance with step 804, each map element is recursively traversed so that a hierarchical data entity can be built from the map. After all elements have been transformed 808, the process ends 807. Thus, the next map element in the logical order of the map entity is found, in accordance with step 805. A determination is made as to whether or not the element has children, in accordance with step 806. If the element has children, it will be processed as a compound element, as described with reference to FIG. 8B. If the element does not have children it will be processed as a simple element, as described with reference to FIG. 8C.

FIG. 8B shows the steps for compound element processing. In accordance with step 810, compound element processing begins with traversing up the map to locate the dataset that is referenced nearest to the compound map element. It is determined whether such a dataset can be located, in accordance with step 877. If a dataset cannot be located, then the next map element is retrieved, in accordance with step 805 in FIG. 8A. If a dataset can be located, then the dataset is traversed for all of the records it contains, in accordance with step 872. For every record in the dataset, an instance of the compound map element is created in the hierarchical data structure, in accordance with step 873. Once the dataset has been processed for the current level of the hierarchical structure, the transformation method moves onto the next element in the map, in accordance with step 805 in FIG. 8A. Subsequently, another determination will be made as to the correct element type, in accordance with step 806, and the portions of the transformation process that are shown in either FIG. 8B or FIG. 8C are followed.

If it is determined in step 806 of FIG. 8A that the current map element does not have children, then it will be processed as a simple element, in the manner shown by FIG. 8C. In accordance with step 820, values are sequentially extracted from each dataset field that map to the simple element, as specified in the hierarchical map entity. Thus, in accordance with step 821, a determination is made as to whether each field contains data. If a dataset field does not contain data, then a simple element is not created in the hierarchical data structure, and the empty field is discarded, in accordance with step 822. If the field contains data, in accordance with step 823, a simple element is created in the hierarchical data structure that corresponds to the simple map element being processed. At this time, any transformation algorithms that are specified in the map file are instantiated and used on the values contained in the fields, in accordance with step 824. In accordance with step 825, the values are added to any other values that correspond to the simple map element. In accordance with step 826, it is determined whether more values exist for the map element. If so, then these values are extracted, resulting in at least one additional iteration of steps 820–826. If there are no more values, then the values that correspond to the simple map element are formed into a complete data value, in accordance with step 827. This final data value is then inserted into the simple element created in the hierarchical data structure. In accordance with step 828, the simple element is then added to the hierarchical data structure as a child of its parent compound element, as specified in the map. Once this is complete, the next map element in the hierarchy is located, in accordance with step 805 in FIG. 8A, and the map element is processed.

Figure 9A:
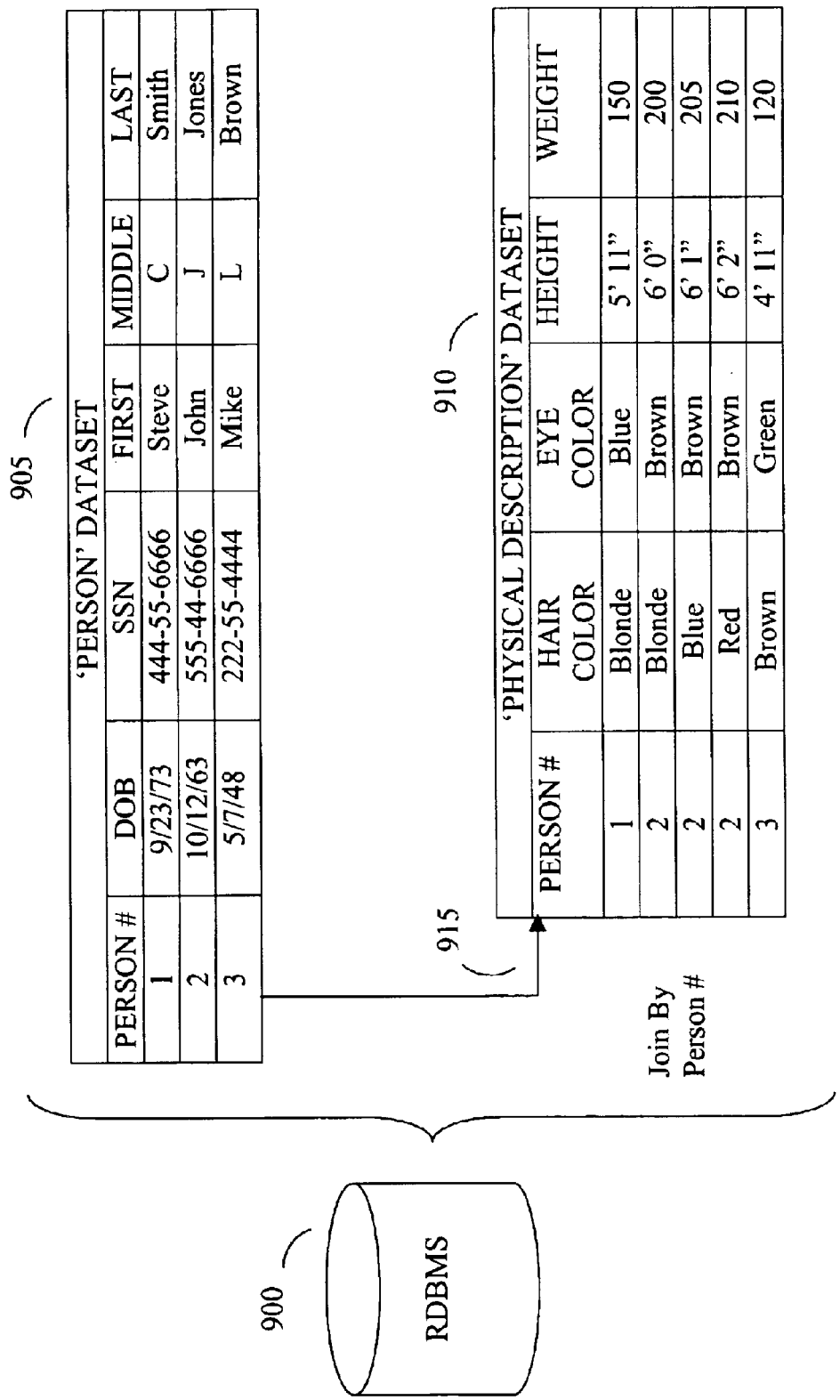
FIG. 9A and FIG. 9B show an example of a creation of a logical record.
Figure 9B:
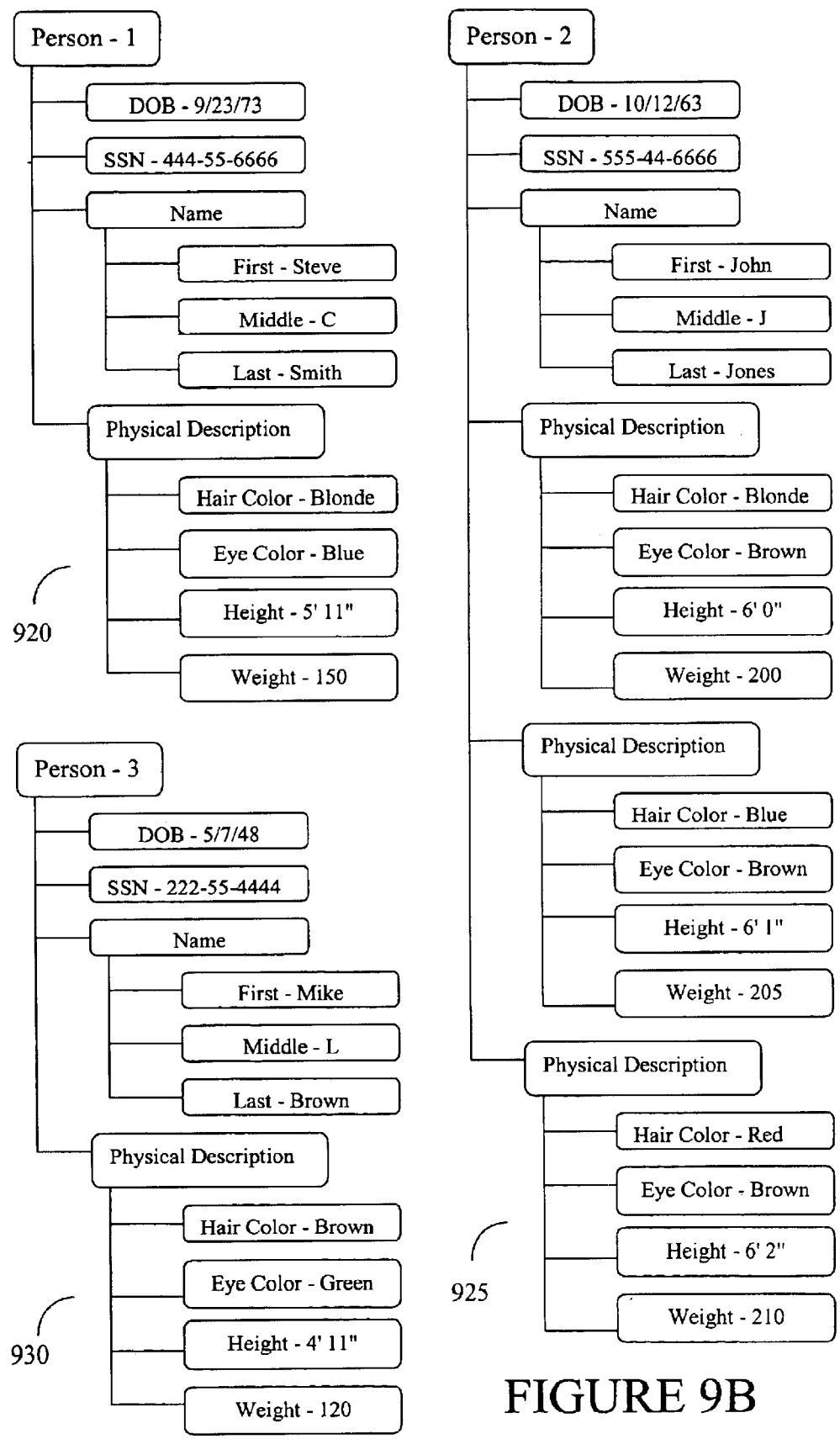

FIG. 9A and FIG. 9B show an example of the creation of a logical record. Two relational datasets 905, 910 contained in a RDBMS 900 are shown transformed into three hierarchical data structures 920, 925, 930. A logical record is a hierarchical representation of associated information that is contained across many datasets. The following example illustrates how a series of datasets may be transformed into hierarchical data entity objects. A RDBMS contains information pertaining to people 900. Several datasets of related information are accessed from the RDBMS by a database command. One dataset is referred to as a 'Person' dataset 905 and contains information about people. Another dataset is known as the 'Physical Description' dataset 970 and contains information that is related to the 'Person' dataset 905. The hierarchical relationship that exists between the two datasets is a primary key field named 'person #' 915. A hierarchical relationship exists between the two datasets where a person can have many physical descriptions. Through following the key structure between the two datasets, three hierarchical data entities emerge. 'Person 1' 920 is a small hierarchical data entity having just one physical description for a person. 'Person 2' 925 is more complex than 'Person 1' 920, having three physical descriptions. Finally, 'Person 3' 930 contains a simple hierarchical entity identical in structure to 'Person 1' 920.

Although the present invention has been described in detail with reference to certain embodiments, it should be apparent that modifications and adaptations to those embodiments may occur to persons skilled in the art without departing from the spirit and scope of the present invention as set forth in the following claims.

What is claimed is:

1. A method for sharing data between a relational database and a hierarchical database, comprising:

defining a hierarchical data entity including a plurality of simple and compound elements, comprising:
identifying an entity path and mapped fields in each simple element; and
identifying an entity path, a database name, a database command, and database fields in each compound element;

mapping each of the plurality of elements in the hierarchical data entity to information in a relational dataset contained in a relational database, comprising:
for each compound element, specifying a data source, specifying a database command, executing the database command, receiving database field names from the relational database, and adding the database field names to the compound element;
for each simple element, selecting a database field name in a parent element corresponding to the simple element, and specifying a data transformation algorithm associated with the simple element;

transforming the relational dataset information into corresponding mapped elements in the hierarchical data entity to form a hierarchical data structure; and accessing data from the hierarchical data structure corresponding to the relational dataset information in the relational database.

2. The method of claim 1, wherein the step of defining a hierarchical data entity comprises defining a hierarchical data entity including a plurality of elements containing a data entity structure and mapping information.

3. The method of claim 2, further comprising identifying each of the plurality of elements by an element name without reference to an entity path.

4. The method of claim 1, wherein the step of defining a hierarchical data entity comprises defining a hierarchical data entity including a plurality of elements containing a data entity structure and defining a hierarchical map structure corresponding to the hierarchical data entity containing mapping information.

5. The method of claim 4, further comprising identifying each of the plurality of elements by an entity path referencing all parent elements in the entity path.

6. The method of claim 1, wherein the step of defining a simple element comprises identifying an element name and mapped fields in each simple element.

7. The method of claim 1, wherein the step of defining a compound element comprises identifying an element name, a database name, a database command, and database fields in each compound element.

8. The method of claim 1, wherein the step of mapping each of the plurality of elements comprises:

reading the hierarchical data entity;

determining if a root element is present;

ending the mapping process if no root element is present;

mapping each compound element of the plurality of elements if a root element is present; and mapping each simple element of the plurality of elements if a root element is present.

9. The method of claim 8, wherein the step of mapping each compound element comprises:

selecting a compound element;

specifying a data source for the compound element;

specifying a database command expression for the compound element;

executing the database command expression;

receiving a dataset containing fieldnames from the data source;

adding the dataset fieldnames to a dataset field list in the compound element for enabling simple elements to map to the information in the dataset; and repeating the above steps for each compound element.

10. The method of claim 8, wherein the step of mapping each simple element comprises:

selecting a simple element;

selecting a source dataset fieldname corresponding to the simple element in a dataset field list of a parent element;

specifying data transformation algorithms associated with the simple element; and repeating the above steps for each simple element.

11. The method of claim 1, wherein the step of transforming the relational dataset information comprises:

receiving the mapped plurality of elements;

creating a dataset for each compound element of the plurality of elements that contains a database command expression;

opening the dataset for each compound element;

transforming each compound element in the mapped elements starting with the root element of the mapped elements; and transforming each simple element of the plurality of elements in the mapped elements.

12. The method of claim 11, wherein the step of transforming each compound element comprises:

selecting a compound element;

locating a dataset that is nearest to a compound element;

creating an instance of the compound element for every record in the dataset; and repeating the above steps for each compound element.

13. The method of claim 11, wherein the step of transforming each simple element comprises:

selecting a simple element;

extracting values from each dataset field that map to the simple element creating a simple element in the hierarchical data structure that corresponds to the simple map element;

transforming data values contained in the dataset fields by transformation algorithms;

adding the transformed values to other values corresponding to the simple map element; and repeating the above steps for all simple elements.

14. A computer program embodied on a computer-readable medium incorporating the method of claim 1.

15. A system for sharing data between a relational and a hierarchical database, comprising:

means for defining a hierarchical data entity including a plurality of simple and compound elements, comprising:

means for identifying an entity path and mapped fields in each simple element;

means for identifying an entity path, a database name, a database command, and database fields in each compound element;

means for mapping each of the plurality of elements in the hierarchical data entity to information in a relational dataset contained in a relational database, comprising:

for each compound element, means for specifying a data source, specifying a database command, executing the database command, receiving database field names from the relational database, and adding the database field names to the compound element;

for each simple element, means for selecting a database field name in a parent element corresponding to the simple element, and specifying a data transformation algorithm associated with the simple element;

means for transforming the relational dataset information into corresponding mapped elements in the hierarchical data entity to form a hierarchical data structure; and means for accessing data from the hierarchical data structure corresponding to the relational dataset information in the relational database.

16. The system of claim 15, wherein the means for defining a hierarchical data entity comprises means for defining a hierarchical data entity including a plurality of elements containing a data entity structure and mapping information.

17. The system of claim 16, further comprising means for identifying each of the plurality of elements by an element name without reference to an entity path.

18. The system of claim 15, wherein the means for defining a hierarchical data entity comprises means for defining a hierarchical data entity including a plurality of elements containing a data entity structure and means for defining a hierarchical map structure corresponding to the hierarchical data entity containing mapping information.

19. The system of claim 18, further comprising means for identifying each of the plurality of elements by an entity path referencing all parent elements in the entity path.

20. A system for sharing data between a relational and hierarchical database, comprising:

a hierarchical data entity having a plurality of simple and compound elements, comprising:

each simple element identifying an entity path and mapped field each compound element identifying an entity path, a database name, a database command, and database fields;

a mapping of each of the plurality of elements in the hierarchical data entity to information in a relational dataset contained in a relational database comprising:

for each compound element, a specified data source, specified database command, executed database command, received database field names from the relational database, and added database field names to the compound element;

for each simple element, a selected database field name in a parent element corresponding to the simple element, and a specified data transformation algorithm associated with the simple element;

a transformation of the relational dataset information into corresponding mapped elements in the hierarchical data entity for forming a hierarchical data structure; and a memory containing data from the hierarchical data structure corresponding to the relational dataset information in the relational database.

21. The system of claim 20, wherein the hierarchical data entity comprises a plurality of elements containing a data entity structure and mapping information.

22. The system of claim 20, wherein the hierarchical data entity comprises a plurality of elements containing a data entity structure and a hierarchical map structure.

23. The system of claim 20, wherein each simple element identifies an element name and mapped fields.

24. The system of claim 20, wherein each compound element identifies an element name, a database name, a database command, and database fields.

25. A computer-readable medium containing a data structure for sharing data between relational and hierarchical databases, comprising:

a hierarchical data structure having a plurality of simple and compound elements stored in the memory;

database commands embedded in the compound elements for accessing information in a relational database;

tabular datasets created in the memory for storing the accessed information from the relational database;

mappings of the plurality of simple and compound elements in the hierarchical data entity to information in relational datasets contained in the relational dataset if a root element is present, comprising:

for each compound element, means for specifying a data source, specifying a database command, executing the database command, receiving database field names from the relational database, and adding the database field names to the compound element;

for each simple element, means for selecting a database field name in a parent element corresponding to the simple element, and specifying a data transformation algorithm associated with the simple element;

transformations of the relational dataset information into corresponding mapped elements in the hierarchical data entity to form a hierarchical data structure; and a relationship between the elements of the hierarchical data structure the tabular datasets.

26. The computer-readable medium of claim 25, wherein the compound elements comprise:

an element name property;

a database name property;

a database command expression; and a database fields property.

27. The computer-readable medium of claim 25, wherein the simple elements comprise an element name property and a mapped fields property.

* * * * *